US010780804B1

(12) United States Patent
Kubota et al.

(10) Patent No.: US 10,780,804 B1
(45) Date of Patent: Sep. 22, 2020

(54) VEHICLE SEAT, SEATING ASSEMBLY FOR A VEHICLE, AND METHOD OF ASSEMBLING THEREOF

(71) Applicant: Honda Motor Co., Ltd., Tokyo (JP)

(72) Inventors: Yuji Kubota, Marysville, OH (US); Derek S. Lindsay, Marysville, OH (US); Ross L. Burghardt, Marysville, OH (US); Michael C. Mraz, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/421,859

(22) Filed: May 24, 2019

(51) Int. Cl.
*B60R 22/26* (2006.01)
*B60N 2/58* (2006.01)
*B60R 22/18* (2006.01)

(52) U.S. Cl.
CPC ............ *B60N 2/58* (2013.01); *B60R 22/18* (2013.01); *B60R 22/26* (2013.01); *B60R 2022/1806* (2013.01)

(58) Field of Classification Search
CPC ...... B60N 2/688; B60N 2/2887; B60N 2/289; B60N 2/2893; B60N 2/58; B60R 22/26; B60R 22/263; B60R 22/266
See application file for complete search history.

(56) References Cited

U.S. PATENT DOCUMENTS

| 5,139,311 | A | * | 8/1992 | Imai | B60R 22/02 297/481 |
| 5,248,356 | A | * | 9/1993 | Shimada | B60R 22/22 156/293 |
| 6,722,733 | B2 | * | 4/2004 | Schmidt | A47C 31/113 297/229 |
| 7,427,103 | B2 | * | 9/2008 | Weber | B60N 2/2893 297/188.2 |
| 8,439,448 | B2 | * | 5/2013 | Murthy | B60N 2/065 297/468 |
| 8,740,309 | B2 | | 6/2014 | Kajihara | |
| 9,457,765 | B2 | * | 10/2016 | Ashtekar | B60R 22/26 |
| 9,592,750 | B2 | * | 3/2017 | Asaeda | B60N 2/58 |
| 10,220,739 | B2 | * | 3/2019 | Okuhara | B60N 2/58 |

(Continued)

FOREIGN PATENT DOCUMENTS

CN 103619659 A 3/2014
DE 10326884 A1 * 1/2005 ........... B60N 2/2893

(Continued)

*Primary Examiner* — Timothy J Brindley
(74) *Attorney, Agent, or Firm* — Kenealy Vaidya LLP

(57) ABSTRACT

A vehicle seat that can include a seat cushion and a concealing lid. The seat cushion can include a lower foam portion, an upper foam portion, and a buckle hole that extends through each of the lower foam portion and the upper foam portion. The concealing lid can be movably connected to the seat cushion to selectively close and open at least a portion of the buckle hole. The concealing lid can span at least a portion of the buckle hole when the concealing lid is in the closed position. The concealing lid can include an end portion that extends into a gap between the upper foam portion and the lower foam portion when the concealing lid is in the closed position. The end portion of the concealing lid can be spaced away from lower foam portion when the concealing lid is in the opened position.

20 Claims, 4 Drawing Sheets

(56) References Cited

U.S. PATENT DOCUMENTS

| | | | |
|---|---|---|---|
| 10,414,298 B2 * | 9/2019 | Shibuya | B60N 2/6009 |
| 2015/0343991 A1 * | 12/2015 | Brodd | B60R 22/26 |
| | | | 297/452.18 |
| 2018/0056820 A1 * | 3/2018 | Sammons | B60N 2/90 |
| 2020/0055427 A1 * | 2/2020 | Styn | B60N 2/5883 |

FOREIGN PATENT DOCUMENTS

| | | | | |
|---|---|---|---|---|
| FR | 3068652 A1 * | 1/2019 | | B60N 2/2887 |
| JP | 2001270359 A * | 10/2001 | | B60N 2/6009 |
| JP | 2004058764 A * | 2/2004 | | B60N 2/2893 |
| JP | 3819142 B2 | 9/2006 | | |
| JP | 2010076500 A | 4/2010 | | |
| JP | 2015054575 A | 3/2015 | | |
| JP | 5870859 B2 | 3/2016 | | |
| JP | 2018095114 A | 6/2018 | | |

* cited by examiner

VEHICLE SEAT, SEATING ASSEMBLY FOR A VEHICLE, AND METHOD OF ASSEMBLING THEREOF

BACKGROUND

The disclosed subject matter relates to a seating assembly for a vehicle. More particularly, the disclosed subject matter relates to methods and apparatus that can facilitate the assembly of a vehicle seat and a buckle assembly in the vehicle.

A vehicle can include a plurality of seats mounted on the floor of the vehicle. Some of the seats can include a seat bottom that is mounted directly to a raised portion of the floor. Alternatively, some of the seats can include a frame assembly that is mounted directly to the floor and supports the seat bottom at a location that is spaced away from the floor.

A seat belt assembly can be associated with each of the seats. The seat belt assembly can include a buckle assembly and a retractable belt assembly that can be selectively connected to and disconnected from the buckle assembly. The buckle assembly can be secured to the vehicle floor. The retractable belt assembly can include a belt that has one end connected to a retractor mechanism that is configured to spool in or pay out a length of the belt. The retractor mechanism can be mounted to the floor or a pillar of the vehicle.

SUMMARY

Some embodiments are directed to a vehicle seat that can include a seat cushion and a concealing lid. The seat cushion can include a lower foam portion, an upper foam portion connected to the lower foam portion, and a buckle hole that extends through each of the lower foam portion and the upper foam portion. The concealing lid can be movably connected to the seat cushion such that the concealing lid moves between a closed position and an opened position to selectively close and open at least a portion of the buckle hole. The concealing lid can span at least a portion of the buckle hole when the concealing lid is in the closed position. The concealing lid can include a plastic plate that includes an end portion that extends into a gap between the upper foam portion and the lower foam portion when the concealing lid is in the closed position. The end portion of the plastic plate can be spaced away from lower foam portion when the concealing lid is in the opened position.

Some embodiments are directed to a seating assembly for a vehicle including a floor. The seating assembly can include a seat and a lid. The seat can be configured to be mounted on the floor of the vehicle. The seat can include a seat cushion and a buckle hole. The seat cushion can include a seating surface and a bottom side spaced away from the seating surface. The buckle hole can include an opening in the seating surface and extend through the seat cushion from the opening to the bottom side. The lid can include an end portion and be movably connected to the seat cushion such that the lid is movable between an opened position and a closed position. The lid can span the buckle hole when the lid is in the closed position. The end portion can deform the seat cushion at a location in the buckle hole when the lid is in the closed position. The end portion of the lid can be spaced away from the location in the buckle hole when the lid is in the opened position.

Some embodiments are directed to a method of assembling a seating assembly for a vehicle that can include providing a buckle assembly including a strap and a buckle, the buckle is connected to a first end of the strap, a second end of the strap is connected to a floor of the vehicle. The method can include providing a vehicle seat including a seating cushion, a buckle hole passing through the seating cushion, and a lid movably connected to the seating cushion. The method can include mounting the vehicle seat on the floor of the vehicle. The method can include moving the lid to an open position such that the lid permits access to at least one of the buckle and the strap through the buckle hole. The method can include moving the at least one of the buckle and the strap through the buckle hole. The method can include moving the lid to a closed position after the at least one of the buckle and the strap passes through the buckle hole such that the lid spans the buckle hole. The method can include deforming a portion of the seat cushion that extends along the buckle hole to define a gap in the seat cushion while moving the lid into the closed position. The method can include extending the end portion of the lid into the gap when the lid is in the closed position.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

During the assembly of a seating assembly, the buckle assembly can be secured to the vehicle floor before the seat is secured to the floor. After the seat is secured to the floor, the buckle assembly is located underneath and/or behind the seat such that the seat conceals the buckle assembly from view by a worker. In order to access the buckle assembly, the worker can reach into a space between the seat back and the seat bottom and retrieve the buckle. Then, the worker can pull the buckle assembly from the concealed position and through the space between the seat back and the seat bottom. The worker can then place the buckle assembly on the seating surface of the seat bottom where a passenger seated in the vehicle can access the buckle assembly.

However, this assembly process can be physically demanding on the worker and time consuming because the buckle assembly might not be readily viewable by the worker and/or the worker can perceive the space through which the worker must pass the buckle assembly as a cramped or confined spaced.

In contrast, a seat bottom of the seat can include a hole that is dimensioned to facilitate extraction of the buckle assembly from the concealed position. However, this hole can be relatively large such that a vehicle user can readily view vehicle structure(s) below and/or behind the seat, which might cause a negative perception by the vehicle user or other occupant.

Accordingly, there is a need for a seating assembly that facilitates assembly of the seat and extraction of the buckle assembly from a concealed position, while also concealing from view other vehicle structure(s) below and/or behind the seat after assembly.

Figure 1:
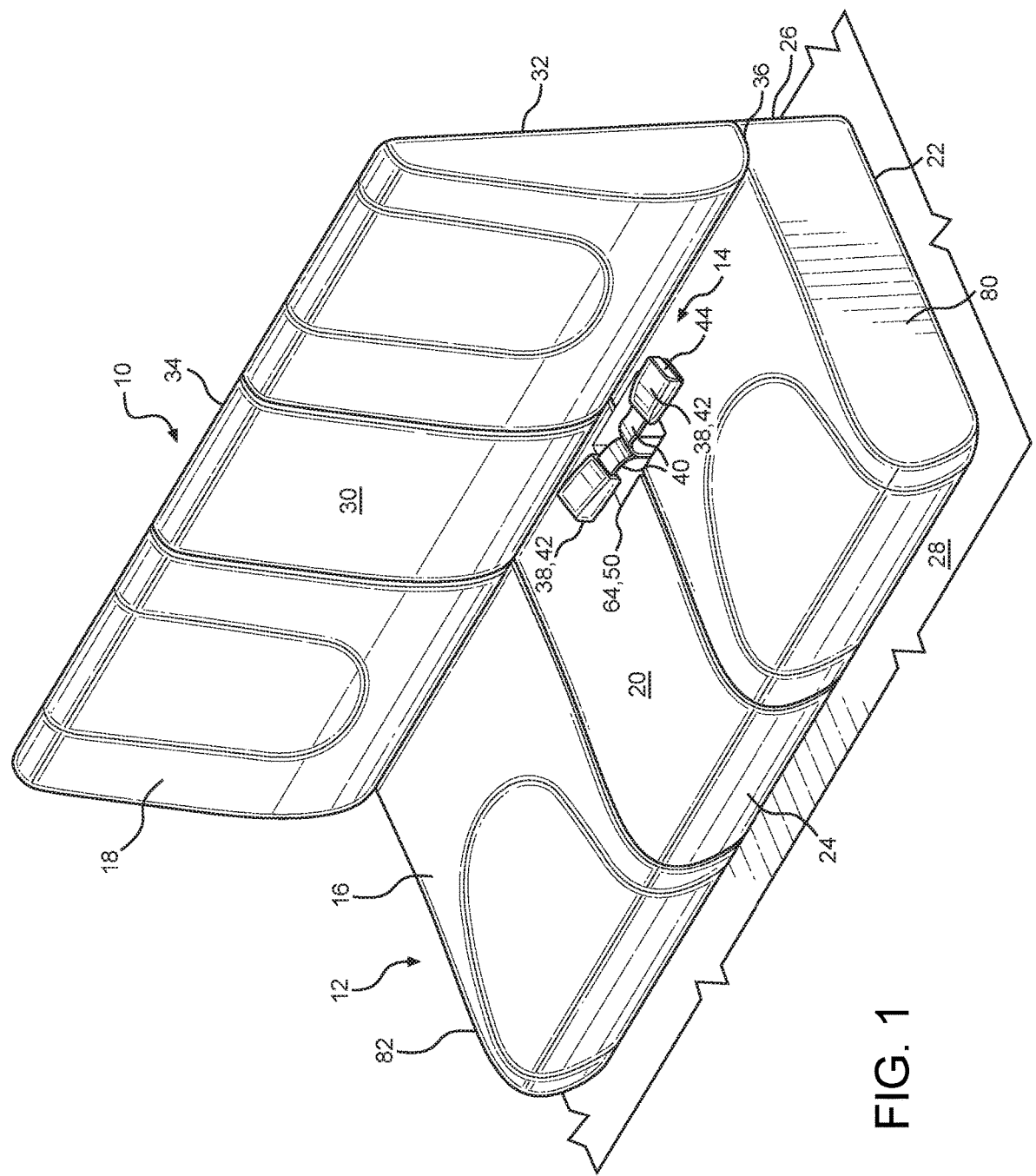
FIG. 1 is a perspective view of a seating assembly for a vehicle in accordance with the disclosed subject matter.

FIG. 1 illustrates an embodiment of a seat assembly 10 made in accordance with principles of the disclosed subject matter. The seating assembly 10 can be mounted in a vehicle and can include a vehicle seat 12 and a buckle assembly 14.

The vehicle seat 12 can include a seat bottom 16 and a seat back 18. The seat back 18 can be fixed relative to the seat bottom 16. Alternatively, the seat back 18 can be movable relative to the seat bottom 16 such that the seat back 18 can be pivoted toward and away from the seat bottom 16. Each of the seat back 16 and the seat bottom 18 can be referred to as a seat cushion. The vehicle seat 12 can include a frame structure that supports the seat bottom 16 and the seat back 18. The seat bottom 16 and the seat back 18 can conceal at least a portion of the frame structure. The frame structure is omitted from the drawing figures for simplicity and clarity of the drawing figures.

The seat bottom 16 can include a top surface 20, a bottom side 22, front surface 24 and a rear surface 26. The top surface 20 can be referred to as a seating surface that is configured to support a passenger or other occupant of the vehicle. The bottom side 22 can oppose a floor 28 of the vehicle. The bottom side 22 can face the vehicle floor 28. The bottom side 22 can extend along the floor 28, or the bottom side 22 can be spaced away from the floor 28 by a seat frame assembly. The floor 28 can also be referred to as floor panel.

The seat back 18 can include a front surface 30, a rear surface 32, a top end 34 and a bottom side 36. The front surface 30 can be referred to as a seating surface. The bottom side 36 can be adjacent to the top surface 20 of the seat bottom 16.

The buckle assembly 14 can include at least one buckle 38 and at least one strap 40 connected to the buckle 38. In the exemplary embodiment of FIG. 1, the buckle assembly can include a pair of buckles 38 and a pair of straps 40.

Figure 8:
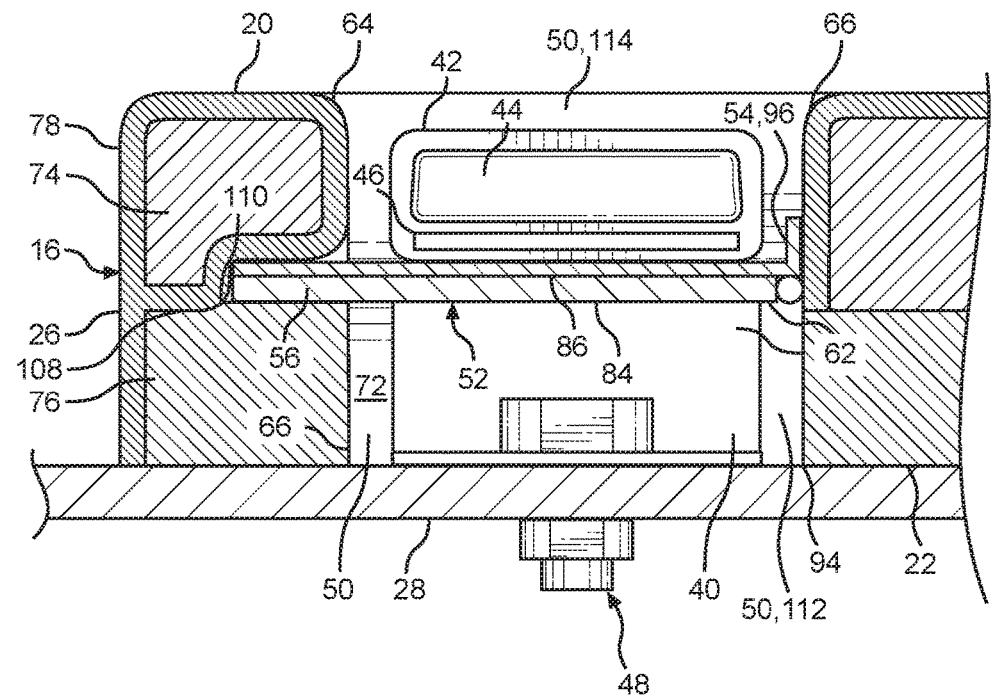
FIG. 8 is a cross-sectional view of taken along line 8-8 in FIG. 7.

Referring to FIGS. 1 and 8, the buckle 38 can include housing 42, a lock release button 44, a tongue opening 46, and a locking mechanism. The locking mechanism can be contained within the housing 42. The slot 46 can be configured to removably receive a tongue of a seat belt in the housing 42 and can provide a passage for the tongue to enter the housing 42 and engage the locking mechanism. The lock release button 44 can be movable to a release position against the bias of a resilient member in order to unlock a tongue that is locked inside the housing 42.

Figure 6:
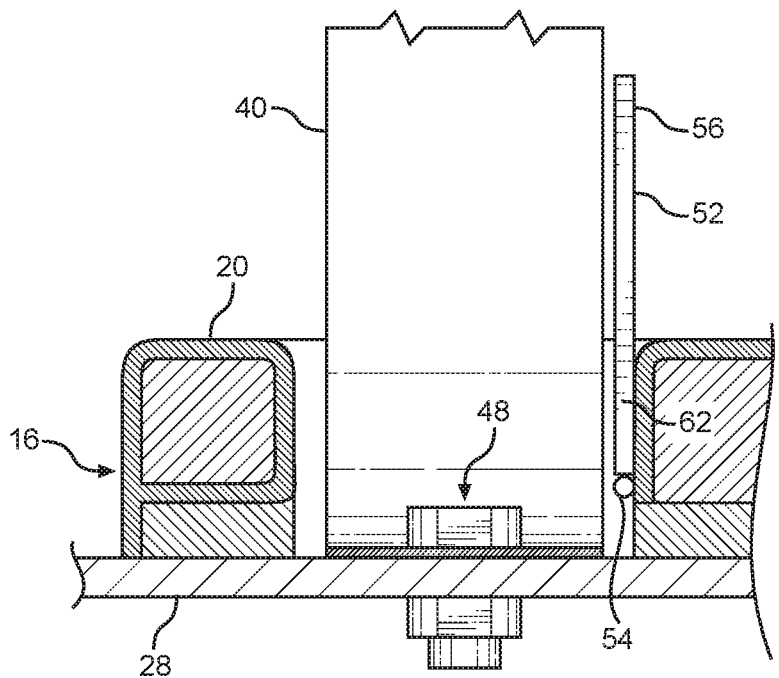
FIG. 6 is the cross-sectional view along line 3-3 of FIG. 2 with the lid in an open position and an exemplary buckle assembly moved to an intermediate state of assembly.

The strap 40 can have any appropriate structural configuration that can transfer a load input by a passenger wearing the seatbelt to a vehicle hard point. The strap 40 can be a rigid structure or a flexible structure. The strap 40 can be configured as a webbing or belt made of a woven synthetic material. The strap 40 can include a first end connected to the buckle 38 and a second end connected to the floor 28. Referring to FIGS. 6 and 8, the second end of the strap 40 can be connected to the floor 28 by a mechanical fastener 48 such as but not limited to a nut and bolt assembly. The mechanical fastener 48 can anchor the strap 40 to any appropriate hard point of the vehicle such as but not limited to a longitudinal frame rail, a transverse cross rail, and a pillar.

The seat bottom 16 can include a buckle hole 50 that is formed as a through hole that extends from the top surface 20 to the bottom side 22 of the seat bottom 16. The buckle hole 50 can facilitate access to the buckle assembly 14 when the vehicle seat 12 and the buckle assembly 14 are initially mounted in the vehicle. For example, the buckle hole 50 can be dimensioned so that the buckle hole 50 is large enough to accommodate a worker's hand while gripping at least one of the buckles 38. However, the size of the buckle hole 50 can also be sized to permit a user of the vehicle to easily view structure(s) of the vehicle that extend underneath the vehicle seat 12. The buckle hole 50 can have any appropriate cross-sectional shape that can facilitate access to the buckle assembly 14 and extraction of the buckle assembly 14 through the buckle hole 50. The buckle hole 50 can have a rectangular cross-sectional shape or other shape for a particular application.

Figure 2:
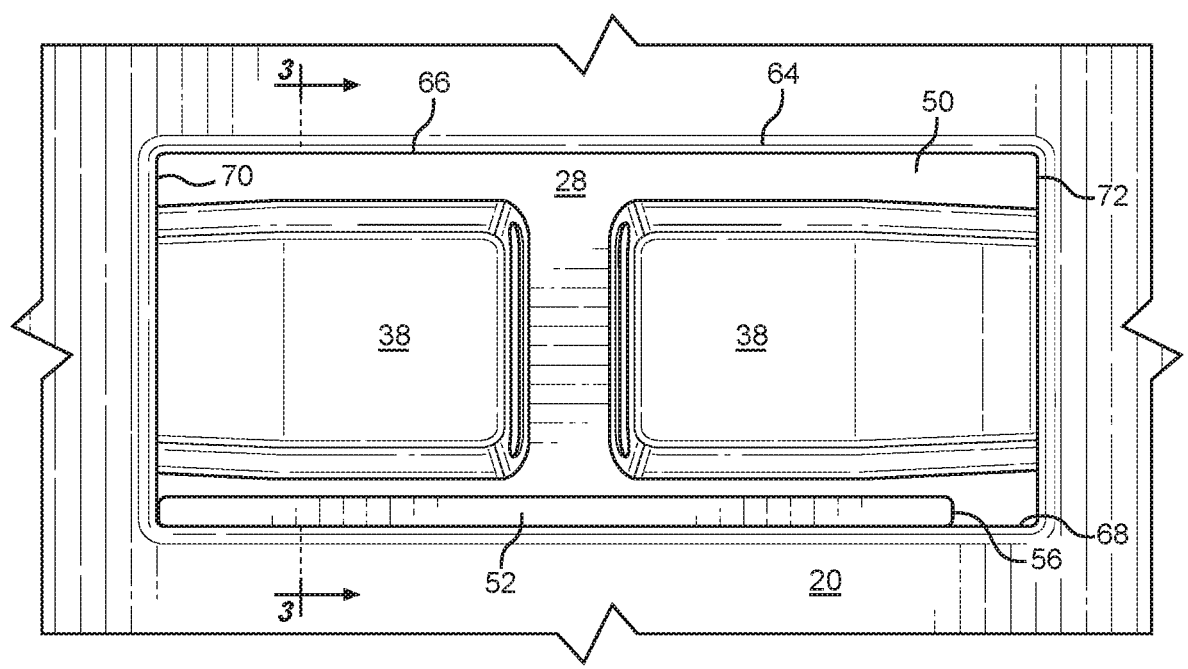
FIG. 2 is a top view of a portion of the seating assembly of FIG. 1 showing a buckle assembly in a first state of assembly.
Figure 3:
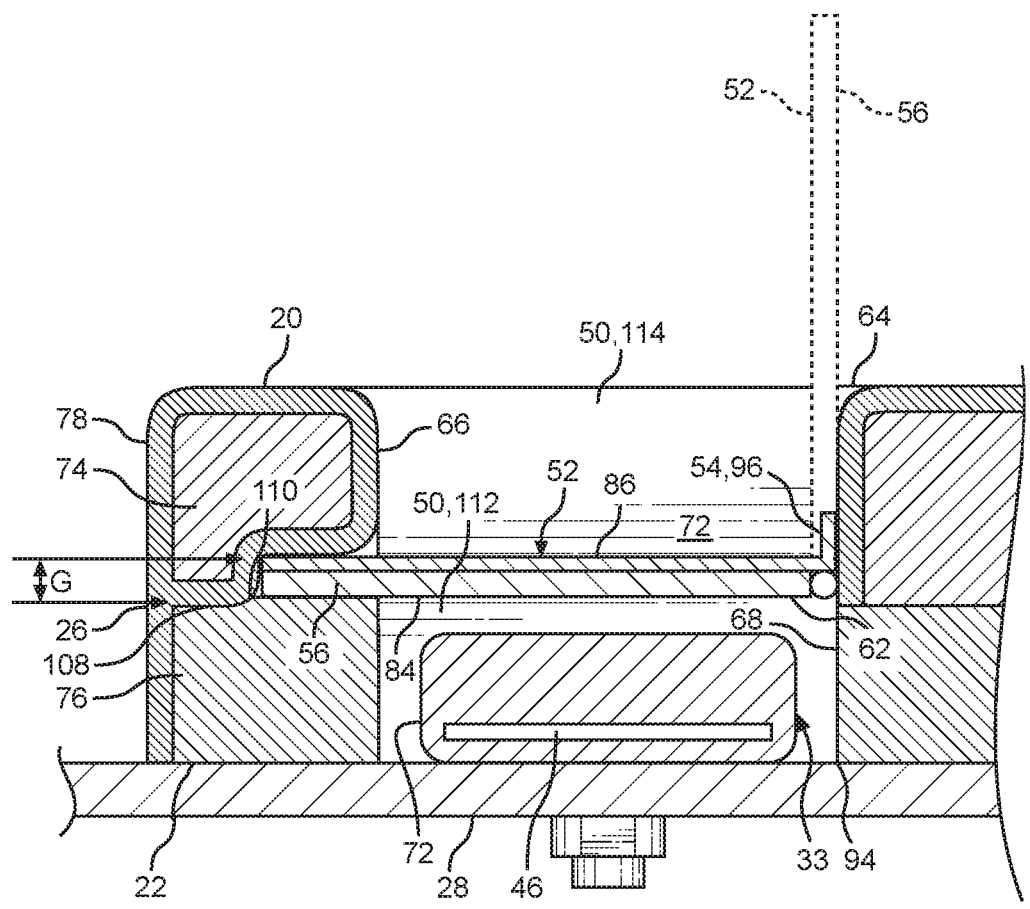
FIG. 3 is a cross-sectional view taken along line 3-3 of FIG. 2.

Referring to FIGS. 2 and 3, the seating assembly 10 can further include a movable lid 52 that spans the buckle hole 50 to at least partially obstruct a user's view through the buckle hole 50 of the vehicle structure(s) underneath the vehicle seat 12. The lid 52 can be movably connected to the vehicle seat 12 such that the lid 52 is movable between an opened position and a closed position. FIG. 2 shows the lid 52 in the closed position. FIG. 3 shows the lid in the closed position in solid lines and in the opened position in phantom lines. In the closed position, the lid 52 can span the buckle hole 50 to at least partially obstruct or conceal a portion of the buckle hole 50 so that some or all of the vehicle structure(s) that extend underneath the seat bottom 16 are obstructed or concealed from view by a user or occupant of the vehicle. In the opened position, the lid 52 can open the previously obstructed or concealed portion of the buckle hole 50 so that a worker can readily view and grasp the buckles 38 and extract the buckles 38 during vehicle assembly, at least one at a time, through the buckle hole 50 with little or no interference between the buckle hole 50 and the worker's hand.

The lid 52 can be connected to the seat bottom 16 such that the lid 52 can pivot with respect to the seat bottom to move between the closed position and the opened position as shown in FIG. 3. For example, the lid 52 can be connected to the seat bottom by a hinge 54. The hinge 54 can be any appropriate living hinge or mechanical hinge that includes a first structure connected to the lid 52, a second structure connected to the seat bottom 16, and a pin pivotally connecting the first structure and the second structure, as schematically illustrated in FIG. 6. In the exemplary embodiment shown in FIGS. 3, 4 and 8, the hinge 54 can be configured as a living hinge such as a stitched seam or simply flexible material.

Figure 4:
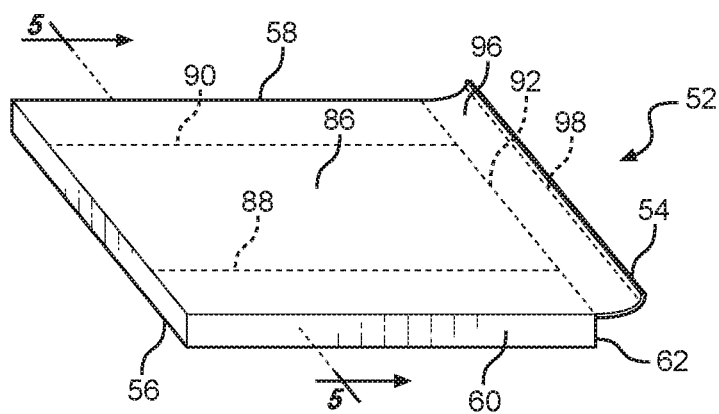
FIG. 4 is a perspective view of an exemplary lid of the seating assembly of FIG. 1.
Figure 5:
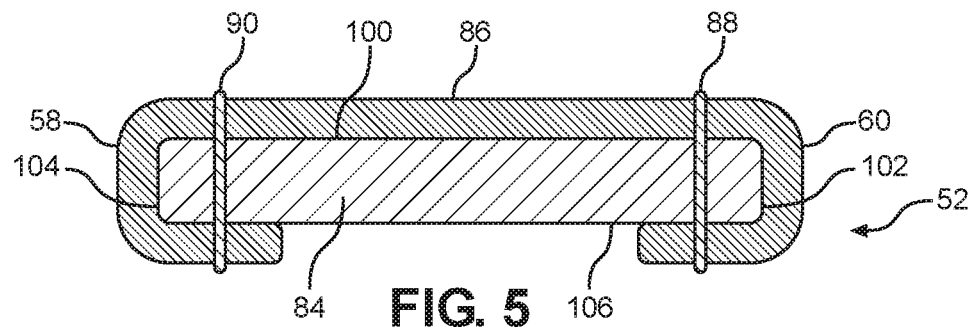
FIG. 5 is a cross-sectional view taken along line 5-5 in FIG. 4.
Figure 7:
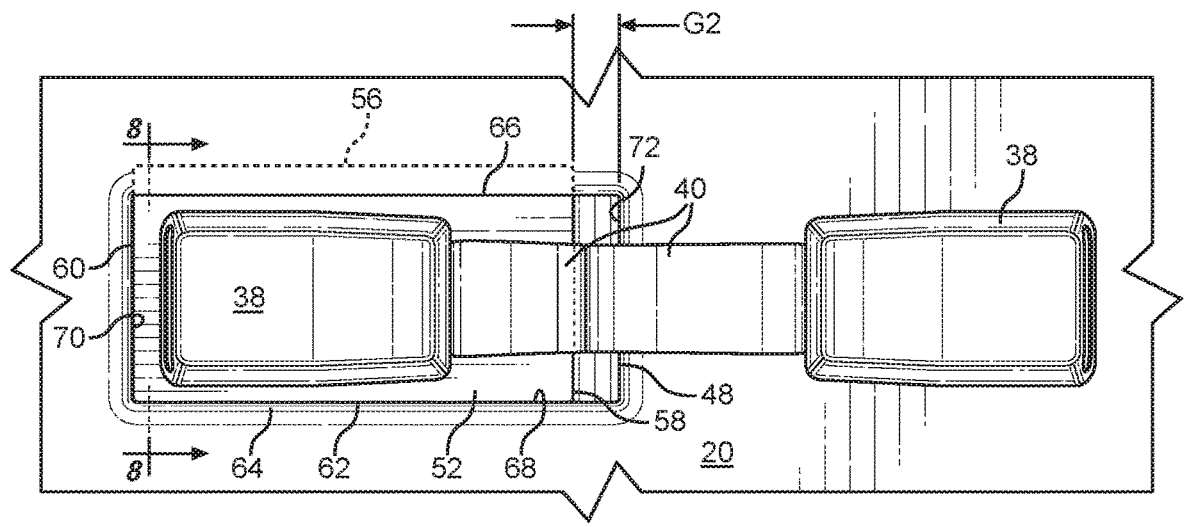
FIG. 7 is a top view of a portion of the seating assembly of FIG. 1 with the buckle assembly and the lid in a final state of assembly.

Referring to FIGS. 3-5, the lid 52 can include an end portion 56, a pair of lateral sides 58, 60, and a hinged portion 62. Referring to FIGS. 3, 7 ad 8 collectively, each of the end portion 56, the first lateral side 58, and the hinged portion 58 can abut a wall of the seat bottom 16 that defines the buckle hole 50 when the lid 52 is in the closed position. Further, the second lateral side 60 can be spaced away from the wall that defines the buckle hole 50 when the lid 52 is in the closed position.

Referring to FIGS. 2 and 3, the end portion 56 can be spaced away from the wall that defines the buckle hole 50 when the lid 52 is in the opened position. The buckle hole 50 can include an opening 64 in the top surface 20 of the seat bottom. The lid 52 can extend through the opening 64 when the lid 52 is in the opened position. The end portion 56 can be located outside of the buckle hole 50 and spaced away from the top surface 20 of the seat bottom when the lid 52 is in the opened position.

The exemplary buckle hole 50 can have a shape such that a longitudinal cross-sectional shape and a transverse cross-sectional shape are rectangular. Referring to FIGS. 2, 3 7, and 8 collectively, the seat bottom 16 can include a plurality of internal walls 66, 68, 70, 72 that collectively define the buckle hole 50. The first and second walls 66, 68 can be substantially parallel to and spaced apart from each other. The third and fourth walls 70, 72 can be substantially parallel to and spaced apart from each other. The third and fourth walls 70, 72 can extend from and be connected to each of the first and second walls 66, 68. Conversely, the first and second walls 66, 68 can extend from and be connected to each of the third and fourth walls 70, 72. The walls 66, 68, 70, 72 can extend from the top surface 20 to the bottom side 22. The walls 66, 68, 70, 72 can extend along the opening 64 and can define a perimeter of the opening 64.

Referring to FIG. 3, the seat bottom 16 can include an upper foam portion 74, a lower foam portion 76, and a trim cover 78. The upper foam portion 74 can be stacked on top of and connected to the lower foam portion 76. The foam portions 74, 76 can be formed from any appropriate material that can provided padded seating structure such as but not limited to polyurethane. The upper foam portion 74 can be formed from a different material or the same material that forms the lower foam portion 76. The upper foam portion 74 can also have a hardness that is less than the hardness of the lower foam portion 76.

The upper foam portion 74 can include or define the opening 64. The lower foam portion 76 can include at least a portion of the bottom side 22 of the seat bottom 16. The lower foam portion 76 can include a bottom opening 94. The buckle hole 50 can extend trough each of the upper foam portion 74 and the lower foam portion 76. The buckle hole 50 can extend from the opening 64 in the top surface 20 to the bottom opening 94 on the bottom side 22 of the lower foam portion 76. The lower foam portion 76 and the upper foam portion 74, together with the trim cover 78, can include respective portions of the walls 66, 68, 70, 72. The walls 66, 68, 70, 72 can extend from along the bottom opening 94 and can define a perimeter of the bottom opening 94.

The trim cover 78 can cover at least a portion of each of the foam portions 74, 78. The trim cover 78 can be any appropriate material such as but not limited to a natural cloth fabric, a synthetic cloth fabric, leather, suede, or any combination thereof. The trim cover 78 can extend along each of the upper foam portion 74 and the lower foam portion 76 such that the trim cover forms the top surface 20, the front surface 24 and the side surfaces 80, 82 of the seat bottom 16. The trim cover 78 can cover any portion of the rear surface 26 that can be viewed by a passenger or other occupant of the vehicle. The trim cover 78 can extend along the walls 66, 68, 70, 72 that define the buckle hole 50. The buckle hole 50 can extend trough the upper foam portion 74 and the lower foam portion 76. Together, the trim cover 78 and the upper foam portion 74 can define and include the top surface 20 of the seat bottom 16.

Referring to FIG. 5, the lid 52 can include a plate 84 and a trim panel 86. The plate 84 can be formed from any appropriate material such as but not limited to a plastic, a metal, carbon fiber, or a composite of two or more materials. The plate 84 can have any appropriate shape that corresponds to the cross-sectional shape of the buckle hole 50. For example, the plate 52 can have a rectangular shape that corresponds to the exemplary rectangular cross-sectional shape of the buckle hole 50.

Referring to FIG. 5, the trim panel 86 can cover a top surface 100 of the plate 84. The trim panel 86 can wrap around the sides 102, 104 of the plate 84. The trim panel 86 can extend along at least a portion of the bottom surface 106 of the plate 84.

The trim panel 86 can be formed from any appropriate material that can be complimentary to the trim cover 78. For example, the trim panel 86 can be formed from the same material as the trim cover 78. Referring to FIGS. 4 and 5, the fabric trim panel 86 can be connected to the plate by a first and second stitching seams 88, 90. The first and second stitching seams 88, 90 can be substantially parallel to and spaced away from a respective one of the lateral sides 58, 60 of the lid 52. The first and second stitching seams can pass through the opposed portions of the fabric trim panel 86 that extend along the top and bottom surfaces 100, 106 of the plate 84.

The fabric trim panel 86 can include a hinge flap 96 that extends beyond the plate 84. The hinge 54 can include the hinge flap 96. The lid 52 can include a third stitching seam 92 that extends between the first and second stitching seams 88, 90. The third stitching seam 92 can extend along the hinged portion 62 of the lid 52. The hinge 54 can include the third stitching seam 92. A fourth stitching seam 98 can connect the hinge flap 96 to the trim cover 78 on the upper foam portion 74 at a location that is in the buckle hole 50. For example, the hinge flap 96 can be connected to the upper foam portion 76 at a located that is adjacent to the joint between the upper foam portion 74 and the lower foam portion 76. The hinge flap 96 can also be connected to the second wall 68.

Referring to FIG. 3, the end portion 56 of the lid 52 can extend into a gap G that the end portion forms when the lid 52 is in the closed position. The trim cover 78 on the upper foam portion can extend along the first wall 66 and along the bottom of the upper foam portion to define a lower surface 108 of the upper foam portion 74. The lower foam portion 76 can include an upper surface 110 that abuts the lower surface 108. The lower surface 108 can be movable relative to the upper surface 110 along a portion of the foam portions 74, 76 that extends along the first wall 66.

Referring to FIGS. 3 and 8, the lid 52 can divide the buckle hole 50 into an obstructed portion 112 and a buckle pocket 114 when the lid 52 is in the closed position. The obstructed portion 112 can extend from the lid 52 to the bottom side 22 of the seat bottom 16. The buckle pocket 114 can extend from the lid 52 to the opening 64 in the top surface 20. As shown in FIG. 3, the buckle assembly 38 can be located in the obstructed portion 112 during the assembly of the seating assembly 10. As shown in FIG. 8, the buckle assembly 38 can be located on the buckle pocket 114 when the seating assembly 10 is a final state of assembly.

During the installation of the seating assembly 10 in the vehicle, the buckle assembly 38 can be secured to the floor 28 of the vehicle before the vehicle seat 12 is installed in the vehicle. Then, the vehicle seat 12 can be mounted on the floor 28 of the vehicle and the buckle assembly 38 can be pulled through the buckle hole 50 and placed on the top surface 20 of the vehicle seat 12 or in the buckle pocket 114.

FIGS. 2 and 3 show a first state of assembly of the seating assembly 10 in which the vehicle seat 12 and the buckle assembly 14 have been installed in the vehicle. However, the buckle assembly 14 is located below the top surface 20 the seat bottom 16 and in or close to the buckle hole 50.

Then, as shown in FIG. 2 and in phantom in FIG. 3, the lid 52 can be moved from the closed position to the opened position such that the lid 52 permits access to at least one of the buckle 38 and the strap 40 through the buckle hole 50. Referring to FIGS. 3 and 6, the lid 52 can extend along the second wall 68, be spaced away from the first wall 66, and extend through the opening 64 when the lid 52 is in the opened position. The worker can observe at least one of the buckle 38 and the strap 40 through the buckle hole 50.

The worker can reach through the buckle hole 50 and grasp at least one of the buckle 38 and the strap 40 and move the least one of the buckle 38 and the strap 40 through the buckle hole 50. After the buckle is extracted from the buckle hole 50, as shown in FIG. 6, the worker can move the lid to the closed position such that the lid 52 spans the buckle hole 50, as shown in FIG. 8.

Before or while moving the lid 52 toward the closed position, the worker can grasp the bottom surface 108 of the upper foam portion 74 and create the gap G between the bottom surface 108 and the upper surface 110 of the lower foam portion by deforming a portion of upper foam portion 74. The worker can then insert the end portion 56 of the lid 52 into the gap G and release the grasp on the upper foam portion 74. Alternatively, the worker can forgo grasping the upper foam portion 74, and instead, deform the upper foam portion 74 with the lid 52.

The end portion 56 of the lid 52 can extend into the gap G and rest on the upper surface 110 of the lower foam portion 76 when the lid 52 is in the closed position. The end portion 56 can continue to deform upper foam portion 74 by compressing the upper foam portion 74 while the lid 52 is in the closed position.

Referring the FIGS. 3, 7 and 8, the end portion 56 of lid 52 can engage and deform the first wall 66 and the second lateral side 70 of the lid 52 can abut the third wall 70 when the lid 50 is in the closed position. Referring to FIG. 7, the first lateral side 58 can be spaced away from the fourth wall 72 when the lid 52 is in the closed position by a second gap G2. The second gap G2 can be configured to accommodate buckle(s) and/or the strap(s) 40 of the buckle assembly 14 when the buckle(s) 38 extend onto the buckle pocket side of the lid 52.

The buckle hole 50 can be dimensioned to facilitate a worker reaching into and extracting the buckle assembly 14 through the buckle hole 50 with little or no interference. The lid 52 can span the buckle opening 50 when the lid 52 is in the closed position. Thus, the lid 52 can obstruct or conceal a view of the floor 28 through the buckle hole 50. Further, the strap(s) 40 and/or the buckle(s) 38 can extend into the second gap G2. Further, the lid can compress the upper foam portion 74 of the seat bottom 16. The reaction force in the upper foam portion 74 can push the lid 52 downwardly against the upper surface 110 of the lower foam portion 76. Thus, the seating assembly 10 can hold the lid 52 in the closed position without any further structure.

Accordingly, the seat assembly 10 can facilitate assembly of the vehicle seat 12 and extraction of the buckle assembly 14 from a concealed position, while also concealing from view other vehicle structure(s) below and/or behind the vehicle seat 12.

While certain embodiments of the invention are described above, it should be understood that the invention can be embodied and configured in many different ways without departing from the spirit and scope of the invention.

For example, embodiments are disclosed above in the context of the seat bottom 16 including the buckle hole 50 and movable lid 52 as depicted in FIGS. 1-8. However, alternate embodiments can include a buckle hole 50 and movable lid 52 that are located in the seat back 18. In another alternate embodiment, the buckle hole 50 can be formed in abutting portions of the seat bottom 16 and the seat back 18.

Although the gap G is shown as formed by deforming a portion of the upper foam portion 74 with lid 52, alternate embodiments can include a gap that is molded into either or both of the upper foam portion 74 and the lower foam portion 76.

The hinge 54 is shown as including a hinge flap 96 of the lid 52 that is sewn onto the second wall 68. However, alternate embodiments can include the hinge flap 96 sewn onto the lower surface 108 of the upper foam portion 74 or the upper surface 110 of the lower foam portion 76. Alternate embodiments can also include a trim cover 78 that includes a continuous integral panel that forms the trim panel 86.

The movable lid 52 can also be formed in multiple portions such that the access to the buckle hole 50 requires opening two or more lid portions that mate together when shut, like in a storm cellar door, or like in a box-end closure tab system.

What is claimed is:

1. A vehicle seat comprising:
a seat cushion that includes a lower foam portion, an upper foam portion connected to the lower foam portion, and a buckle hole that extends through each of the lower foam portion and the upper foam portion; and
a concealing lid that is movably connected to the seat cushion such that the concealing lid moves between a closed position and an opened position to selectively close and open at least a portion of the buckle hole, the concealing lid spans at least a portion of the buckle hole when the concealing lid is in the closed position, the concealing lid includes a plastic plate that includes an end portion that extends into a gap between the upper foam portion and the lower foam portion when the concealing lid is in the closed position, the end portion of the plastic plate is spaced away from lower foam portion when the concealing lid is in the opened position.

2. The vehicle seat according to claim 1, wherein the lower foam portion has a first hardness and the upper foam portion has a second hardness that is less than the first hardness, and
the plastic plate compresses the upper foam portion and rests on the lower foam portion when the concealing lid is in the closed position.

3. The vehicle seat according to claim 1, wherein
the lower foam portion includes a bottom side that faces a vehicle floor when the seat cushion is mounted in a vehicle,
the upper foam portion includes a seating surface configured to support a passenger, and the buckle hole extends from the seating surface to the bottom side.

4. The vehicle seat according to claim 1, further comprising a hinge that pivotally connects the concealing lid to the seat cushion.

5. The vehicle seat according to claim 4, wherein the hinge is a living hinge.

6. The vehicle seat according to claim 1, wherein the concealing lid further includes a fabric panel connected to the plastic plate, the fabric panel includes a hinge flap that is sewn onto the seat cushion such that the hinge flap forms a hinge about which the plastic plate is movable when the concealing lid moves between the opened position and the closed position.

7. The vehicle seat according to claim 1, wherein
the upper foam portion includes a seating surface and an opening in the seating surface,
the buckle hole is in communication with and extends from the opening in the seating surface, and
the plastic plate is located between the lower foam portion and the opening when the concealing lid is in the closed position.

8. The vehicle seat according to claim 1, wherein
the seat cushion includes,
a pair of first walls spaced apart from each other and,
a pair of second walls spaced apart from each other, each of the second walls extends from and is connected to each of the first walls,
the pair of first walls and the pair of second walls define the buckle hole,
the concealing lid abuts each of the first walls and one of the second walls when the concealing lid is in the closed position, and
the concealing lid is spaced away from a different one of the second walls when the concealing lid is in the closed position such that a gap extends between the concealing lid and the different one of the second walls.

9. The vehicle seat according to claim 8, wherein
the upper foam portion includes a seating surface and an opening in the seating surface,
the lower foam portion includes a bottom side and a bottom opening in the bottom surface,
each of the first walls and each of the second walls extends from the the opening in the seating surface to the bottom opening in the lower foam portion such that the buckle hole is in communication with the opening in the seating surface and the bottom opening in the bottom surface, and
the plastic plate is pivotally connected to the one of the second walls at a location that is between the opening in the seating surface and the bottom opening in the lower foam portion.

10. The vehicle seat according to claim 8, wherein the concealing lid extends along the one of the first walls, is spaced away from a different one of the first walls, and extends through the opening in the seating surface when the concealing lid is in the opened position.

11. A seating assembly for a vehicle including a floor, the seating assembly comprising:
a seat configured to be mounted on the floor of the vehicle, the seat includes,
a seat cushion that includes a seating surface and a bottom side spaced away from the seating surface, and
a buckle hole that includes an opening in the seating surface and extends through the seat cushion from the opening to the bottom side; and
a lid that includes an end portion and is movably connected to the seat cushion such that the lid is movable between an opened position and a closed position, the lid spans the buckle hole when the lid is in the closed position, the end portion deforms the seat cushion at a location in the buckle hole when the lid is in the closed position, and the end portion of the lid is spaced away from the location in the buckle hole when the lid is in the opened position.

12. The seating assembly according to claim 11, wherein the seat cushion includes,
a first foam portion that includes a seating surface and a first surface on a side opposite to the seating surface, and
a second foam portion that includes a second surface that abuts the first surface, and
the end portion of the lid extends between a portion of first surface and a portion of the second surface when the lid is in the closed position.

13. The seating assembly according to claim 12, wherein
the first foam portion has a first hardness and the second foam portion has a second hardness that is greater than the first hardness, and
the lid compresses the first foam portion to form a gap between the first foam portion and the second foam portion when the lid is in the closed position such that the lid extends into the gap and rests on the second foam portion.

14. The seating assembly according to claim 11, further comprising a hinge pivotally connecting the lid to the seat cushion.

15. The seating assembly according to claim 14, wherein the hinge is a living hinge.

16. The seating assembly according to claim 11, wherein the lid includes,
a plastic plate, and
a fabric panel sewn onto the plastic plate, the fabric panel includes a hinge flap that is sewn onto the seat cushion such that the fabric panel forms a hinge about which the plastic plate is movable between the opened position and the closed position.

17. The seating assembly according to claim 11, wherein
the seat cushion includes a bottom side that is spaced away from the seating surface, and
the lid is located between the bottom side and the opening in the seating surface when the lid is in the closed position.

18. The seating assembly according to claim 11, wherein the seat cushion includes,
a pair of first walls spaced apart from each other,
a pair of second walls spaced apart from each other, each of the second walls extends from and is connected to each of the first walls,
the pair of first walls and the pair of second walls define the buckle hole,
the lid abuts each of the first walls and one of the second walls when the lid is in the closed position, and
the lid is spaced away from a different one of the second walls when the lid is in the closed position such that a gap extends between the lid and the different one of the second walls.

19. The seating assembly according to claim 18, further comprising a buckle assembly that includes,
a buckle configured to releasably connect to a tongue of a seat belt, a strap including a first end configured to be connected to the floor of the vehicle and a second end connected to the buckle, at least one of the strap and the buckle extends through the gap when the lid is in the closed position, the seat is mounted on the floor of the vehicle, and the strap is connected to the floor of the vehicle.

20. A method of assembling a seating assembly for a vehicle comprising:

providing a buckle assembly including a strap and a buckle, the buckle is connected to a first end of the strap, a second end of the strap is connected to a floor of the vehicle;

providing a vehicle seat including a seating cushion, a buckle hole passing through the seating cushion, and a lid movably connected to the seating cushion;

mounting the vehicle seat on the floor of the vehicle;

moving the lid to an open position such that the lid permits access to at least one of the buckle and the strap through the buckle hole;

moving the at least one of the buckle and the strap through the buckle hole;

moving the lid to a closed position after the at least one of the buckle and the strap passes through the buckle hole such that the lid spans the buckle hole;

deforming a portion of the seat cushion that extends along the buckle hole to define a gap in the seat cushion while moving the lid into the closed position; and extending the end portion of the lid into the gap when the lid is in the closed position.

* * * * *